B. F. PADRICK.
SAW CLAMP.
APPLICATION FILED APR. 9, 1909.
960,389.
Patented June 7, 1910.
2 SHEETS—SHEET 1.
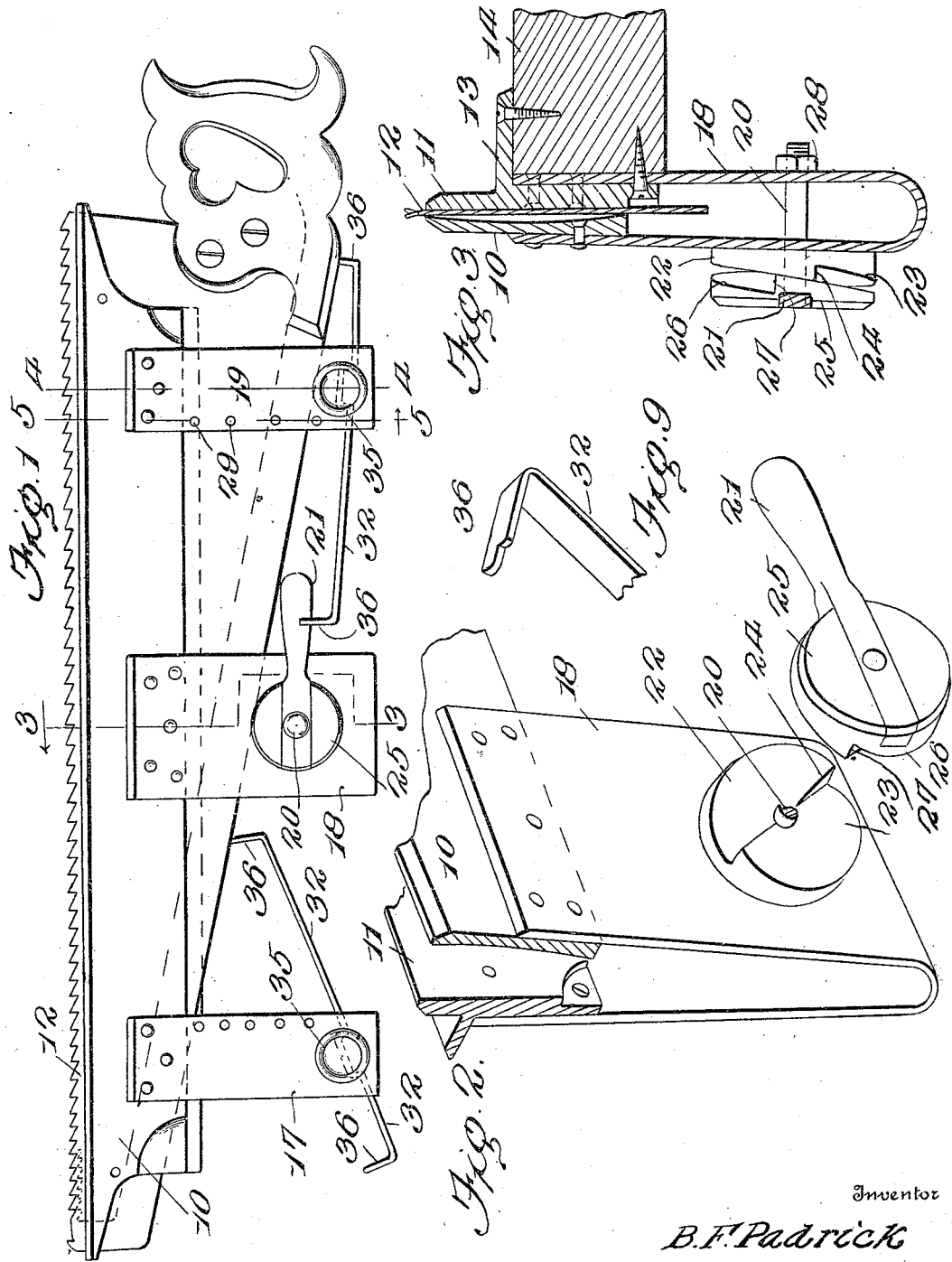
Witnesses
W. N. Woodson
J. M. Fallin
Inventor
B. F. Padrick
By
R. H. a. Macy, Attorneys.

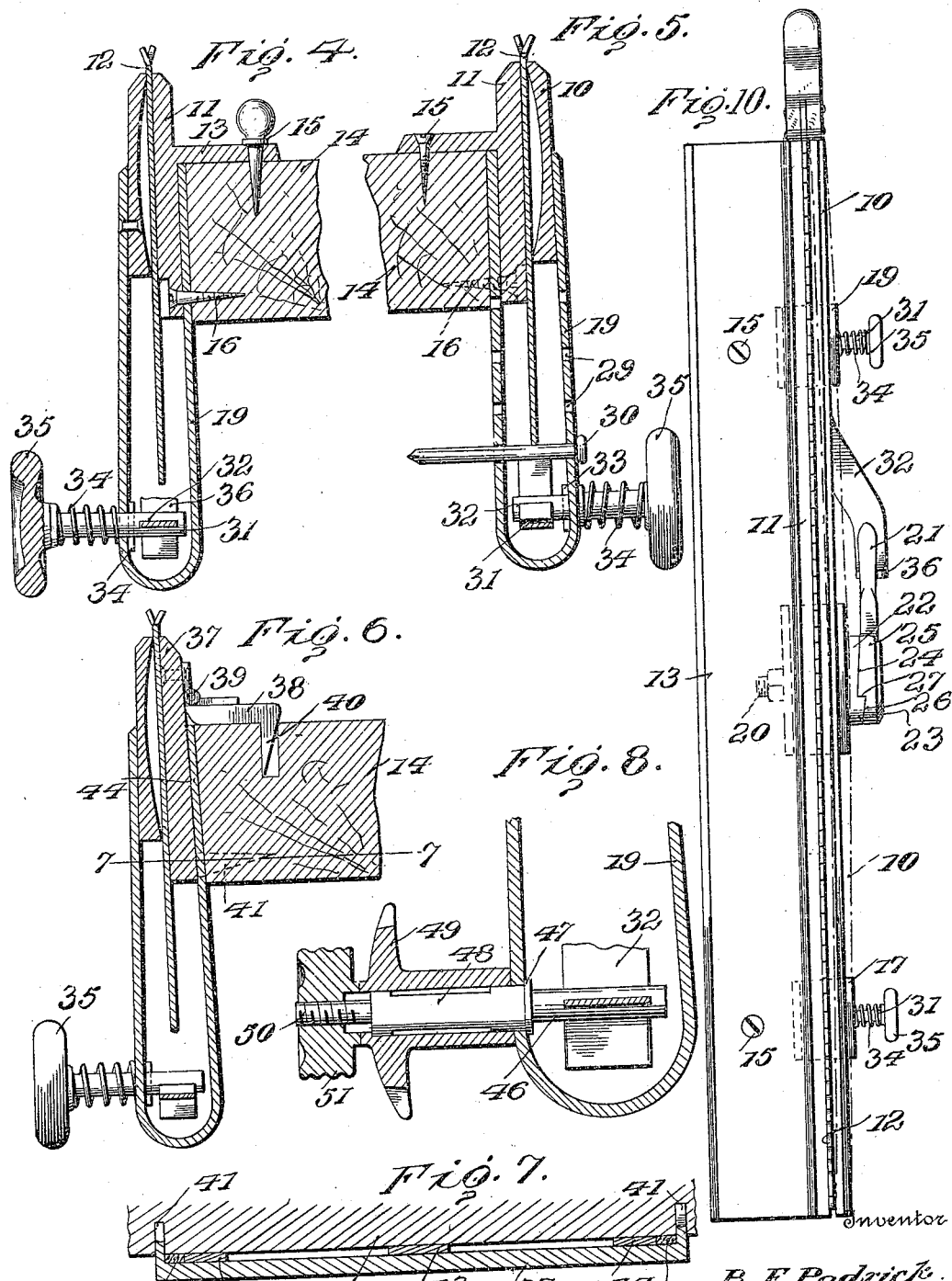

UNITED STATES PATENT OFFICE.

BENJAMIN F. PADRICK, OF PORTLAND, OREGON.

SAW-CLAMP.

960,389.

Specification of Letters Patent. Patented June 7, 1910.

Application filed April 9, 1909. Serial No. 488,906.

*To all whom it may concern:*

Be it known that I, BENJAMIN F. PADRICK, citizen of the United States, residing at Portland, in the county of Multnomah and State of Oregon, have invented certain new and useful Improvements in Saw-Clamps, of which the following is a specification.

This invention relates to tool holders and refers particularly to a clamp adapted to support a saw or the like while the teeth of the same are being filed or otherwise acted upon.

The invention has for an object the provision of a clamp which is provided with a concaved body which is likewise bent inwardly at its opposite outer ends in order to form a firm gripping member to secure the same rigidly in position.

The invention has for another object the provision of a clamp which engages the entire length of the saw so that it is not necessary to shift the position of the saw during the sharpening of the teeth of the same in order to retain the entire length of the saw rigidly in fixed position. This feature is believed to save time in the handling of many saws such as are used around buildings, carpenter shops, where many saws are to be sharpened.

The invention further contemplates the provision of guides for regulating the position of the saw when disposed in the clamp so as to insure the ascertaining of an even edge of the saw teeth above the clamp. The guide is adapted to prevent the saw from dropping through the clamp or into the lower portion of the same, thereby causing annoyance and loss of time in withdrawing the saw from the clamp and thereby prevents the damaging of the teeth after the same have been sharpened by reason of the falling of the saw within the clamp.

The invention has for a still further object a clamp which is provided with clamping means which is of such formation as to position the gripping jaws rigidly against the saw and thereby prevents lost motion during the filing action which also lengthens the life of the file and eliminates the noise incident to such lost motion. A clamping means employed in connection with this clamp is of such formation that the same may be applied or adapted to other devices than clamps of this type as the same effects a quick and easily operated means for securing any movable members together. This clamp is also provided with means which enables the positioning of the same upon the edge of a work-table in a quick and easy manner and which is provided with series of registered apertures disposed vertically on the same for the reception of nails or pins to support heavy saws when it is desired to dispose the same within the clamp, thereby effecting a device which is adaptable to practically any form of elongated tool or instrument which is to be supported for any purpose.

Other objects and advantages of this invention will be set forth in the specification which describes in detail the arrangement, combinations and formations of the several elements which constitute the device and which will be set forth in the appended claims.

For a full understanding of the invention reference is to be had to the following description and accompanying drawing, in which:—

Figure 1 is a side elevation of the complete device disclosing a hand-saw as being positioned in the same. Fig. 2 is a detailed perspective view of the central operating spring, the clamping jaws being disclosed in section.
Fig. 3 is a transverse section on the line 3—3 of Fig. 1. Fig. 4 is a vertical transverse section on the line 4—4 of Fig. 1. Fig. 5 is a section on the line 5—5 of Fig. 1. Fig. 6 is a transverse vertical section through the clamp disclosing a modified form of the fastening means therefor. Fig. 7 is a longitudinal horizontal section through the inner jaw of the clamp disclosing the modification set forth in Fig. 6. Fig. 8 is a detailed sectional view of the end springs disclosing a modified form of clamping means to adjust the saw in position. Fig. 9 is a detailed perspective view of one end of one of the arms employed in connection with the clamp, and Fig. 10 is a top plan view of the complete clamp disclosing a saw secured in the same, the outer jaw being disclosed in dotted lines in an open position.

Corresponding and like parts are referred to in the following description and indicated in all the views of the drawings by the same reference characters.

Referring to the drawings, the numerals 10 and 11 designate the two jaws of the clamp which are adapted for engagement against the opposite sides of a saw 12. The jaw 11, which is designated as the inner or fixed jaw, is provided with a flange 13 which extends longitudinally rearwardly from the rear face of the jaw 11 at right angles thereto and which is adapted for engagement upon the upper face of a workbench 14, or the like. The flange 13 is provided with apertures through which nails 15, screws or the like are engaged to support the jaw 11 rigidly thereto.

For the purpose of securing the lower edge of the jaw 11 against the outer edge of the work-table 14 the jaw 11 is apertured at spaced points for the reception of nails 16, screws or the like to form a rigid fastening means for the jaw 11. The jaw 10, which is the outer or movable jaw, is disposed in parallel with the jaw 11 and is cut away at its lower end to admit of the engagement of a hammer or other tool for securing the nails 16 through the lower edge of the jaw 11. The jaw 10 is transversely concaved at its inner face in order to form a firm gripping surface against the saw 12. The jaw 10 is also curved inwardly at its opposite ends to engage the opposite ends of the saw 12 and to thereby form a firm gripping hold upon the same when the power is applied centrally of the jaw 10. The jaws 10 and 11 are held in parallel relation by means of springs 17, 18 and 19 which are of U-formation, and which are secured at their upper free extremities against the opposite outer faces of the jaw 11, the springs 17 and 19 being positioned adjacent the opposite extremities of the jaws 10 and 11 while the spring 18 is intermediately positioned therefrom.

For the purpose of contracting the jaws 10 and 11 the intermediate spring 18 is provided at a point intermediately thereof with a bolt 20 which is transversely disposed through the same and which is extended forwardly at its headed extremity to engage through a hand-lever 21. The outer arm of the spring 18, which is depended from the jaw 10 is provided with a cam 22 which is concentrically disposed about the bolt 20 and which is provided with inclined faces 23 upon its outer side which terminate in shoulders 24 for coöperation with a second cam 25 which is carried upon the bolt 20 and rigidly connected to the hand-lever 21. The cam 25 is provided with oppositely formed beveled faces 26 and shoulders 27 which co-act with the beveled faces 23 and shoulders 24 for the purpose of contracting the arms of the spring 18 by reason of the expansive action of the cams 22 and 25 to force the outer arm of the spring 18 inwardly from the hand-lever 21, the bolt 20 being adjustably held in fixed position against the inner arm of the spring 18 by means of a clamping nut 28.

The springs 17 and 19 are each provided with series of apertures, which are designated as 29 and which are formed in registered relation in the opposite arms of the same in juxtaposition to the inner edges thereof for the reception of nails 30, pins or the like for the purpose of supporting the inverted upper edge of the saw 12 when positioned in the clamp. The nails 30 are employed however, only when a heavy saw or tool is positioned in the clamp, as when it is desired to secure cross-cut saws between the jaws 10 and 11, but for guiding and supporting the ordinary hand-saws used about carpenter shops and buildings, the springs 17 and 19 are provided with the following arrangement.

The springs 17 and 19 are each provided adjacent their curved or lower extremities with transverse spindles 31 which are terminated adjacent the rear arms of the springs and which are split diametrically for the reception of the inner ends of arms 32 which are formed of sheet metal and which extend radially therefrom. The arms 32 are secured to the spindles 31 by the offsetting of the inner extremities of the same against the sides of the spindles as shown by dotted lines in Fig. 1 after the insertion of the same therethrough. The spindles 31 are retained between the arms of the springs 17 and 19 by the insertion of studs 33 through the same for engagement against the inner faces of the outer arms of the springs 17 and 19. The arms 32 are frictionally retained in adjusted position by the employment of coil springs 34 which are engaged about the outer ends of the spindles 31 and impinged between the outer faces of the outer arms of the springs 17 and 19 and hand-wheels 35 which are mounted upon the outer ends of the spindles 31 and are employed for the purpose of rotating the spindles 31 in order to direct the extension of the arms 32. The arms 32 are each provided with a concaved projection 36 (Fig. 9) which is adapted to receive the inverted upper edge of the saw 12. The upper edges of the jaws 10 and 11 are longitudinally beveled at their outer faces in order to present a smooth and rounded edge for the engagement of the hands of the operator during the filing of the teeth of the saw 12 which is disposed between the same.

In the modification which is disclosed in Figs. 6 and 7, the inner jaw 37 is provided with a supporting strip 38 in lieu of the flange which is rearwardly extended therefrom in the preferred form, the supporting strip being disposed hingedly against the rear face of the jaw 37 upon the hinge 39, and being provided at its outer edge adjacent the opposite ends of the same with spurs 40 which are disposed in rectangular relation to the reinforced strip 38, the straight edge thereof being positioned inwardly. The inner lower edge of the supporting strip 38 is rounded so as to admit of the downward swinging movement of the same when the spurs 40 are embedded in the bench 14 and to prevent the binding of the lower edge of the reinforcing strip 38 during such action. In this modified form the jaw 37 is supported at its lower edge by the employment of spurs 41 which are extended rearwardly at right angles to the jaw upon the opposite end of the same, the right angled edges of the spurs being disposed inwardly in order to enable the rigid positioning of the same in the work-bench 14. The jaw 37 is provided in the same manner as the preferred form with the springs 42, 43 and 44, the springs 42 and 44 being positioned adjacent the opposite ends of the jaw 37, the jaw 37 being provided with blocks 45 which are disposed between the end springs 42 and 44 and the spurs 41. The employment of the blocks 45 is for the purpose of off-setting the leverage of the jaw 37 in driving the supports 41 into the work table 14 one at a time; as if a blow be delivered upon one of the supports the adjacent spring (43 or 44) will act as a fulcrum to raise the opposite support from the work table. This positioning of the blocks 45 is therefore believed to be a decided advantage in securing spurs in this relation into a solid body, as otherwise a fixed and permanent securing means could not be employed by the adaptation of the same.

The employment and operation of the device is as follows:—

The jaw 11 is positioned against the outer edge of the work-table 14, the flange 13 being disposed upon the upper face of the same when the nails 15 and 16 are positioned through the flange 13 and lower edge of the inner jaw 11 respectively, and engaged in the work-bench 14. The clamp is thus securely held in position and is now in readiness to receive the saw 12. The saw 12 is positioned between the jaws 10 and 11, the inverted upper edge of the same being engaged upon the concaved portions 36 carried upon the arms 32 and thereby being prevented from dropping downwardly into the lower ends of the springs 17, 18 and 19. The hand-wheels 36 are now rotated in order to adjust the teeth of the saw in alinement above the upper edges of the jaws 10 and 11 when the hand-lever 21 is grasped and given a quarter rotation which causes the riding of the cam 25 over the inclined surfaces formed upon the cam 22, thereby pressing the cam 22 and outer arm of the spring 18 inwardly to cause the engagement of the concaved inner face of the jaw 10 against the side of the wall 12. As the outer corners and edges of the jaw 10 first engage with the saw it is readily seen that the tension exerted upon the same through the medium of the spring 18 is increased proportionately to the pressure upon the jaw 10 by the rotation of the hand lever 21, thereby forming a clamp which rigidly holds the jaw 10 against the saw 12. When the hand-lever 21 is raised in order to release the jaw 10 from the saw 12 the arms 32, by reason of the frictional engagement of the spiral spring 34 with the outer faces of the outer arms of the springs 17 and 19, retain the saw 12 in fixed relation between the jaws 10 and 11 and admit of the lifting of the saw 12 upwardly out of the clamp and preventing of the dropping of the same into the lower ends of the springs 17, 18 and 19.

In the modification disclosed in the drawings when the clamp is positioned upon the work-bench 14 the inner jaw 37 is positioned against the outer edge of the bench when the spurs 41 are driven inwardly to engage in the table 14, the supporting strip 38 being retained in an upward position during this action, when the supporting strip is swung downwardly against the upper face of the work-table 14 and the spurs 40 are then driven into the same.

In Fig. 8 is disclosed a modified form of retaining means to be employed in connection with the spring arms 32 to adjustably support the saw 12 in position. This means comprises a spindle 46 mounted in the lower end of each of the springs 17 and 19, the spindle having a shoulder 47 formed thereon for engagement against the inner face of the outer arm of the adjacent spring 19 upon which the same is carried. The spindle 46 extends through the supporting spring and is provided with a tongued portion 48 upon which a hand-wheel 49 is disposed in sliding engagement and adapted to move against the outer face of the supporting spring in order to frictionally clamp the spindle 46 in position. The outer extremity of the spindle 46 is reduced and threaded as at 50 upon which is supported a lock-nut 51 adapted to be impinged against the outer end of the hand wheel 49 in order to prevent the accidental dislodgement of the same during the vibration of the clamp.

Having thus described the invention, what is claimed as new is:—

1. A clamp as specified comprising a pair of jaws, U-shaped springs disposed on said jaws at equi-distances throughout the lengths of the same, means carried by one of said jaws for securing the same upon a work-table, arms pivotally disposed in the end springs for suitably supporting a saw between said jaws, a bolt engaged through the intermediate spring, a cam carried upon the outer face of said intermediate spring about said bolt, a hand-lever mounted on said bolt and a cam carried by said hand-lever for co-operation with said cam carried by said springs for contracting said springs and clamping said jaws against a saw disposed between the same.

2. A clamp as specified comprising a pair of jaws, U-shaped springs carried by said jaws, means disposed on one of said springs for contracting said jaws, arms carried by the end springs for adjustably supporting a saw between said jaws, and a flange rearwardly extended inwardly from the inner of said jaws for engagement upon the upper face of a work-table, said flange and said inner jaw being provided with a plurality of apertures for the reception of nails therethrough to secure the same upon a work-table.

3. A clamp as specified comprising a pair of jaws, U-shaped springs positioned on said jaws at equi-distances throughout the lengths of the same to resiliently support said jaws adjacent one another, a flange rearwardly projected from the inner of said jaws for engagement upon a work-table, the outer of said jaws being provided with an inner concaved face for engagement with a saw disposed between said jaws, means carried by said springs for adjustably supporting the saw between said jaws and means carried by one of said springs for contracting said jaws and clamping the saw in position.

4. A clamp as specified comprising a pair of jaws, U-shaped springs secured at their opposite ends to said jaws to resiliently support the same in parallel, means carried by one of said jaws for supporting the same upon a work-table, the opposite of said jaws having a concaved inner face, a pair of arms located between the arms of said springs for adjustably supporting the saw between said jaws, a cam mounted upon the outer face of one of said springs, a second cam mounted against the outer face of said first cam, a bolt carried by the inner arm of said spring with said cam, said bolt extended forwardly through the outer arm of said spring and through said cam, and a hand-lever carried upon said bolt and secured to said second cam for effecting the rotation thereof to contract the arms of said springs to clamp said jaws against said saw.

5. A clamp as specified comprising a pair of jaws, U-shaped springs depended at intermediate points from said jaws, means carried by one of said springs for contracting said jaws, spindles disposed through the lower ends of the end springs, hand-wheels mounted on the outer ends of said spindles, helical springs mounted about said spindles between said hand-wheels in the outer faces of the springs which support the same and radially extended arms positioned upon the inner ends of said spindles for engagement against the inverted upper edge of a saw positioned between said jaws, said arms adapted for adjustment by the rotation of said spindle under the friction of said helical springs.

6. A saw clamp including two jaws, one of said jaws adapted for engagement upon a work table, springs carried by said jaws to retain the same in parallel position, members carried by the outer of said springs for adjustably retaining a saw between said jaws and means connected to the jaws for contracting the same.

7. A saw clamp including a pair of jaws, means carried by said jaws for resiliently supporting the same, a clamp connected to said jaws, for contracting the same, and arms connected to said jaws for adjustably supporting a saw between the said jaws.

In testimony whereof I affix my signature in presence of two witnesses.

BENJAMIN F. PADRICK. [L. S.]

Witnesses:
W. T. VAUGHN,
B. E. VAN VOORHIS.